May 29, 1951         G. WALTERS         2,555,261
BRAKE LINING
Filed June 21, 1949         3 Sheets-Sheet 1
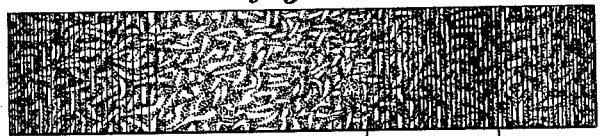
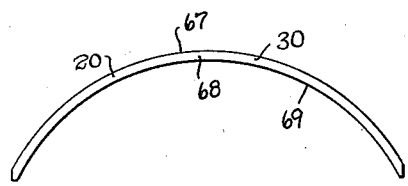
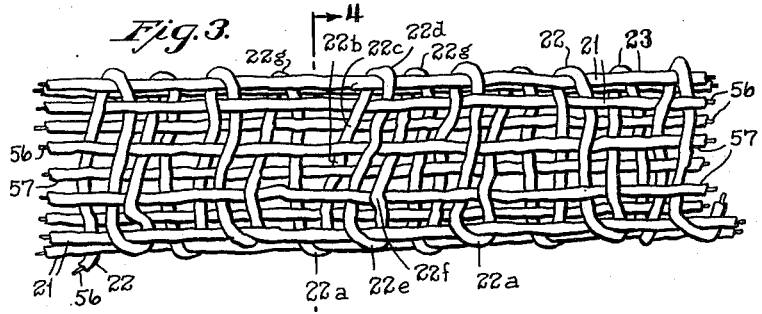
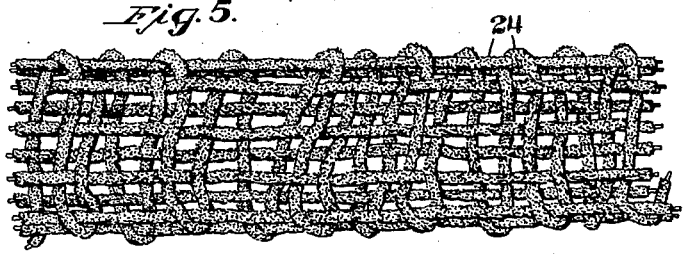
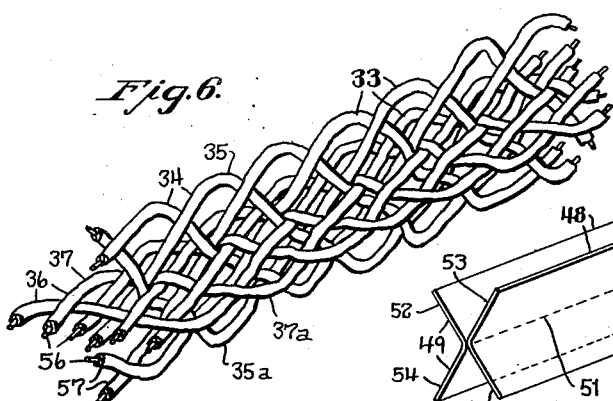
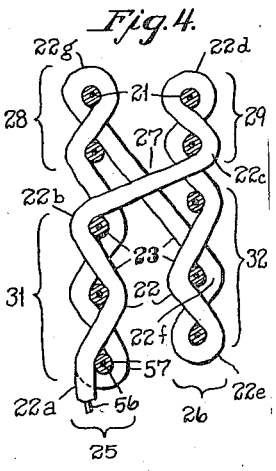
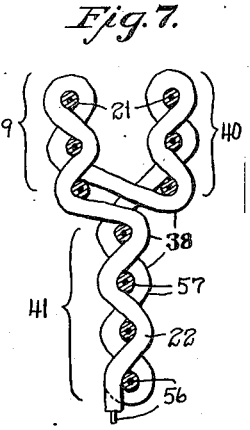
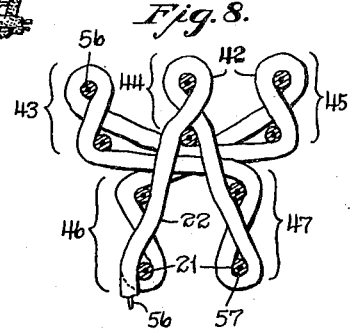
Inventor
Gustav Walters
By Seymour Earle Nichols
Attorneys May 29, 1951            G. WALTERS            2,555,261
BRAKE LINING
Filed June 21, 1949            3 Sheets-Sheet 2
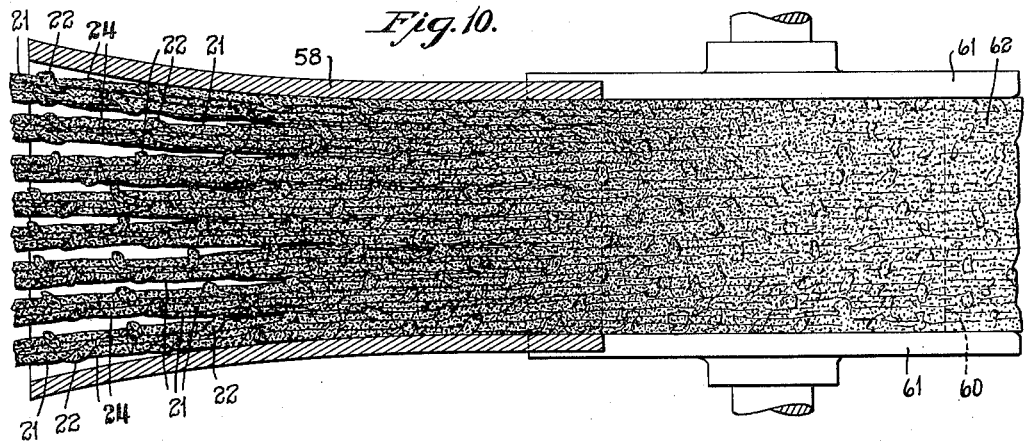
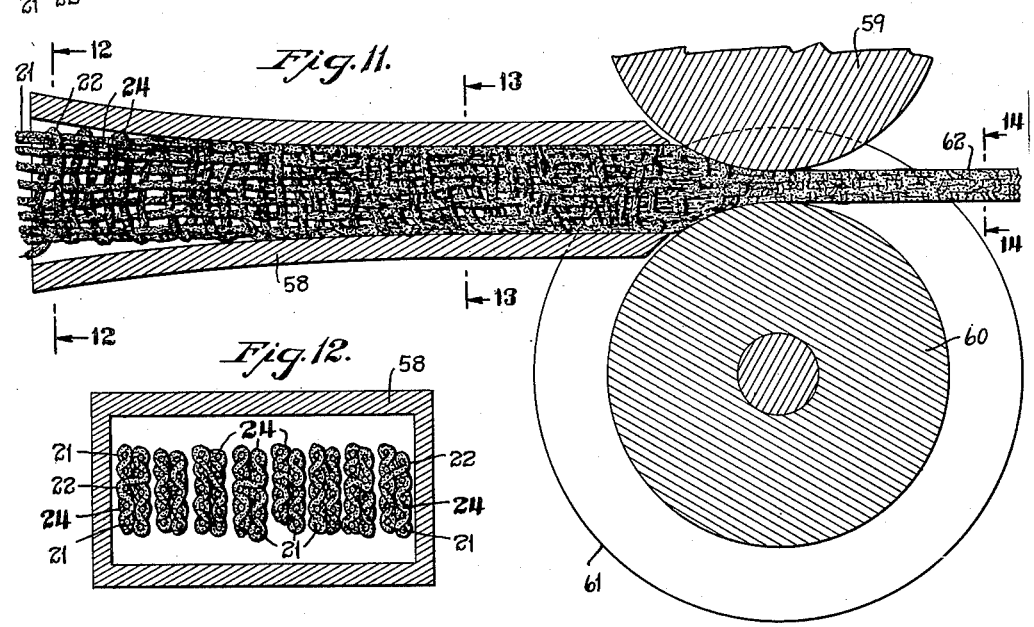
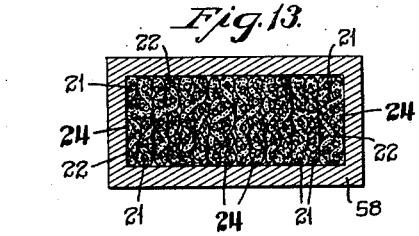
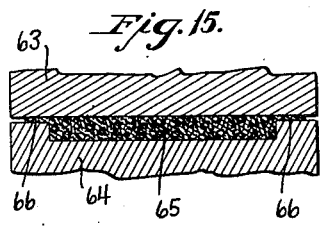
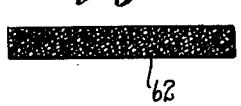
Inventor
Gustav Walters
By Seymour Earl Nichols
Attorneys May 29, 1951  G. WALTERS  2,555,261
BRAKE LINING
Filed June 21, 1949 3 Sheets-Sheet 3
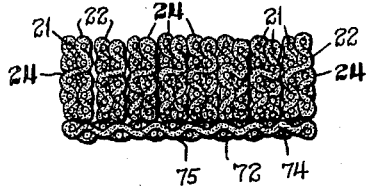
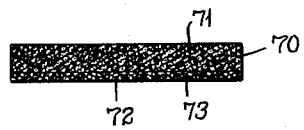
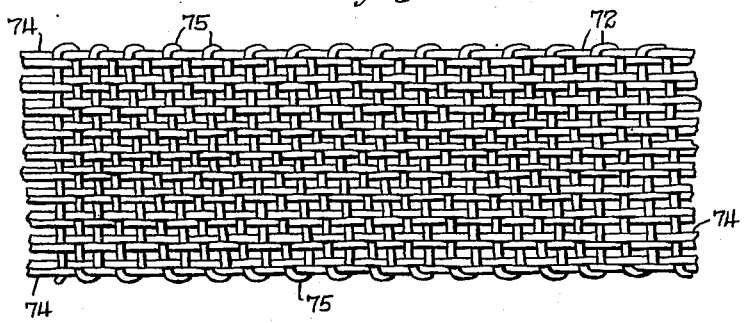
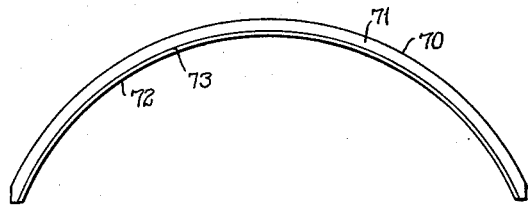
Inventor
Gustav Walters
By Seymour Earle Nichols
Attorneys Patented May 29, 1951

2,555,261

UNITED STATES PATENT OFFICE 2,555,261

BRAKE LINING

Gustav Walters, Middletown, Conn., assignor to The Russell Manufacturing Company, Middletown, Conn., a corporation of Connecticut Application June 21, 1949, Serial No. 100,507

6 Claims. (Cl. 28—80)

This invention relates to improvements in brake-linings.

One object of this invention is to provide an improved brake-lining which will have a longer wear-life.

Another object of this invention is to provide an improved brake-lining which will have a more uniform coefficient-friction throughout the life of the lining as it is being worn down in use.

With the above and other objects in view, as will appear to those skilled in the art from the present disclosure, this invention includes all features in the said disclosure which are novel over the prior art.

In the description and claims, the various parts and steps are identified by specific terms for convenience, but they are intended to be as generic in their application as the prior art will permit.

In the accompanying drawings forming part of the present disclosure, in which certain ways of carrying out the invention are shown for illustrative purposes:

Fig. 1 is a top plan view of a brake-lining strip or member made in accordance with the present invention;

Fig. 2 is an edge elevation of Fig. 1;

Fig. 3 is a side elevation of a fragment or portion of a length of a woven member or web used in making brake-lining in accordance with the present invention;

Fig. 4 is an enlarged transverse sectional view on line 4—4 of Fig. 3 with the two web-sections of the web shown as spaced apart for clearness;

Fig. 5 is a view similar to Fig. 3 after the web of Fig. 3 has been impregnated with friction-material;

Fig. 6 is a perspective view of a modified form of web which is braided instead of being woven;

Fig. 7 is a view similar to Fig. 4 of a modified form of woven web having three branches instead of the four branches of Fig. 4;

Fig. 8 is a view similar to Fig. 4 of another modified form of woven web having five branches instead of four;

Fig. 9 is a perspective view of another modified form of web-member, a plurality of which can be used in forming a brake-friction strip;

Fig. 10 is a top plan view, partly in section, illustrating a method of forming a plurality of impregnated webs similar to the webs of Figs. 3 and 4 arranged in side-by-side relation and upon their edges, into a brake-lining strip or member;

Fig. 11 is an edge elevation partly in longitudinal section of Fig. 10;

Fig. 12 is a transverse sectional view on line 12—12 of Fig. 11;

Fig. 13 is a transverse sectional view on line 13—13 of Fig. 11;

Fig. 14 is a transverse sectional view on line 14—14 of Fig. 11;

Fig. 15 is a transverse sectional view illustrating the pressing operation employing heat and pressure;

Fig. 16 is a view corresponding to Fig. 12, of a modified construction but with the forming-tube omitted;

Fig. 17 is a view corresponding to Fig. 15, but with the dies omitted and the flash removed, of the modified construction illustrated in Figs. 16 to 19;

Fig. 18 is a top plan view of the reticular woven bottom member shown as forming the bottom portion of the brake-lining of Figs. 16 to 19; and Fig. 19 is an edge elevation similar to Fig. 2, of the modified form of brake-lining illustrated in Figs. 16 and 17.

Referring to Figs. 1 to 5 and 10 to 15 of the drawings, showing the particular form of the invention chosen for illustration therein, the brake-lining member or brake-friction strip 20 is made from a plurality of heat-hardenable bonding friction-material-impregnated webs as will be more fully presently described. Each of the webs is made as illustrated in Figs. 3 to 5 by interlacing a plurality of longitudinal or warp strands 21 with a transverse or weft strand 22 by weaving them very loosely to form an open web 23. The looseness of the weave and the few picks of the weft strand 22 make relatively-large spaces or openings or interstices which greatly facilitate the penetration of a thick liquid impregnating friction-material that is used to form the impregnated web 24 of Fig. 5.

The web-member 23 illustrated in Figs. 3 and 4 may, for convenience, be said to comprise two web-sections 25 and 26 interconnected to one another at 27 by the weft 22. The upper web-branches 28 and 29 respectively form the upper portions of the web-sections 25 and 26, and extend upwardly in Fig. 4 from the interconnecting weft-portions at location 27 to form one face of the brake-friction strip 20, which may, for example, be the friction-face portion 30 of the friction-strip. And the other branches 31 and 32 respectively form downwardly-extending branches of the web-sections 25 and 26.

The web-member 23 is woven by the weft 22 passing from the location 22a at the bottom left of Fig. 4, upwardly and being interwoven with warps 21 to about the middle of the left web-section 25 at 22b where it crosses over at 27 to the right web-section 26 at 22c, and then is interwoven with warps 21 to the top 22d of the right web-section 26 to thus complete one weft-pick, then the weft 22 is interwoven with warps 21 all the way down to 22e at the bottom of the right web-section 26 to complete the second weft-pick, then weft 22 is interwoven with warps 21 to about halfway up the right web-section 26 at 22f, and then crosses over at 27 to the left web-section 25 and to the top 22g thereof to complete the third pick, and then is woven with warps 21 down to the bottom 22a of the left web-section 25 to complete the fourth pick, whereupon it is ready to start weaving the next repeat cycle of four weft-picks. Actually, the two web-sections 25 and 26 are close together, but Fig. 4 has been shown in enlarged exaggerated form with the interconnecting portions of the weft 22 shown longer at the interconnecting or cross-over region 27, for clearness of illustration. If the upper two branches are spread away from one another and the lower two branches are spread away from one another, in the actual web as made, the cross-sectional appearance of the web is of X-form.

The modified form of web 33 illustrated in Fig. 6, instead of being woven as in the case of web 23 just described, is illustrated as made by braiding, and by this braided construction, a web-member of X-shape in cross section is produced having one braided section 34 which has two branches 35, 35a lying in one plane, and interbraided through another braided section 36 which has two branches 37, 37a lying in another plane. The web-member 33 would be used similar to the web-member 23 previously described, by impregnating it with heat-hardenable bonding friction-material and forming it into a flattened web, from a plurality of which impregnated webs or web-lengths a brake-lining strip can be made, in a manner as will hereinafter appear. No particular bonding friction-material is any part of the present invention, and any suitable bonding friction-material may be used, such, for example, as bonding material containing a phenol-formaldehyde type of resin, as is well known to those skilled in the art.

In the modified form of the invention illustrated in Fig. 7, the web-member 38 has two branches 39 and 40 which extend in the same general direction in which they will ultimately form the friction-face portion of a brake-lining, and a third branch 41 which extends in the opposite direction toward the rear face of the brake-lining.

In the modified form of the invention illustrated in Fig. 8, the web-member 42 is woven to have three branches 43, 44 and 45 extending in the same general direction to form the friction-face portion of the brake-lining, and with two other branches 46 and 47 extending toward the rear face of the friction-disk.

Instead of forming the web-member of a single member having woven or braided or otherwise interlaced strands, the web-member 48 schematically shown in Fig. 9 may be formed of two independently woven or braided or otherwise interlaced flat web, sections or webs 49 and 50 which are stitched together along a line indicated at 51 so that when the branches 52 and 53 are spread apart, and the oppositely-extending branches 54 and 55 are also spread apart, a composite web-member is formed of general X-shape in cross section in appearance.

While all of the strands illustrated in the drawings have a metal wire center or core 56 with a surrounding covering of asbestos material 57, for some friction uses, wire could be entirely eliminated from use. Or wire, for example, could be employed only in the wefts, or in the wefts and only in the warps which are to form the friction-face portion of the finished brake friction-strip.

But, ordinarily, it is advantageous to employ wire-cored asbestos strands to form all of the strands of the web used in making brake friction-strips according to the present invention.

Fig. 4 is considerably schematic, and the interconnecting portions of the weft 22 at the interconnecting region 27 are longer than is actually the case, whereas the two web-sections 25 and 26 are actually close together, and also the weft strands or weft picks in the finished pressed form will be more nearly vertical than would appear from Fig. 4.

A suitable number of dried impregnated webs or web-lengths such as 24 are passed in side-by-side contact relation with one another through a tapered forming-tube 58 (Figs. 10 and 11) of generally rectangular internal cross-sectional form, which presses the webs 24 sidewise together and closes up the spaces between the web-members 24, and slightly compresses the members 24 down edgewise (Figs. 11 and 13), whereupon the pressed-together web-members 24 (Figs. 10 and 11) pass between a pair of rolls 59 and 60, the roll 60 of which has a pair of flanges 61 spaced apart the same distance as the width of the pressed-together webs 24 as they leave the forming-tube 58. The rolls 59 and 60 press the webs 24 down edgewise to a relatively-dense coherent mass forming a strip 62 of the general form illustrated in Fig. 14. The compressed coherent strip 62 is then cut into suitable lengths, each of which is subjected to heat and pressure between die-members 63 and 64 (Fig. 15) to densify and semi-cure the strip 62 into a heat-hardened unitary dense member 65 having flash-portions 66, which flash-portions are subsequently trimmed off, whereupon the trimmed members 65 are heated and bent to and held in their final curved form, such as illustrated in Fig. 2, whereupon they are given the necessary additional heat treatment to completely cure them to final condition, after which they are ground to the finished form illustrated in Figs. 1 and 2. If the brake-lining is to be secured to a brake-shoe by cementing, rivet-holes are not needed, otherwise the lining would be provided with the usual rivet-holes. The friction or braking-face portion 30 of the lining provides an arcuate braking-face 67 throughout the wear-life of the lining, and the back-portion 68 provides the back-face 69 which, of course, is not subject to any wear.

Instead of having the impregnated web-members form the entire brake-lining strip or member, a brake-lining member 70 (Fig. 17) can be formed by employing impregnated web-members such as 24 for forming the braking-face portion 71 of the brake-lining 70, and by employing a reticular backing-member 72 (Figs. 16 to 19) to form the back-face portion 73. The member 72 may be woven (Fig. 18) by weaving longitudinal or warp strands 74 with a transverse or weft strand 75. The strands 74 and 75 can be of wire-cored asbestos or of bare wire, or of other suitable material, or the member 72 can be any reticular member having sufficient mechanical strength to prevent possible splitting of the lining-member by the rivets commonly employed to secure the lining-member on a brake-shoe. Fig. 16 corresponds to Fig. 12 of the previously-described form of the invention with the forming-tube omitted and with the addition of the reticular backing-member 72 at the back thereof. The brake-lining 70 of Fig. 17 corresponds to the similar member illustrated in Fig. 15 but with the dies omitted and the flash removed.

Fig. 19 illustrated a side edge view similar to Fig. 2, of the brake-lining member 70 having the reticular reinforcing member 72 forming the back-face portion 73 thereof. Where a backface reinforcing-member 72 is employed, it will be made of a thickness in the final brake-lining which will never be reached during the wear-life of the brake-lining, so that all the braking action throughout the wear-life of the brake-lining will take place against a portion of the impregnated web or webs of interlaced strands, which impregnated webs will ordinarily occupy more than half the thickness of the finished brake-lining.

By having each web-member provided with at least two branches extending in the same general direction to form the friction-face portion 30 of the brake friction-strip 20, a web-member is provided with a larger number of weft picks in the friction-face, with the consequence that there is a large number of upstanding ends of the weft picks extending transversely to the general plane of the friction-face. This results in improved wear-resistance of the friction-face portion of the brake-lining strip. And, where the weft picks carry or have cores or are formed of metallic wire, such, for example, as brass, the large number of these wires extending transversely to the friction-face rapidly conducts the heat away from the surface of heat-generation at the friction-face and therefore prevents as high a rise in temperature as would otherwise occur. Also, as the friction-face wears down, the weft-strand ends are worn away in a general direction transversely to their longitudinal length, thereby retaining these larger numbers of weft-pick ends as part of the friction-forming surface, and without their being completely worn away and then reappearing, and then wearing away again. Therefore, this larger number of weft-pick ends, especially where they have metal cores or metal wires otherwise extending along them, gives a more uniform friction-coefficient and a higher amount of metal in the friction-face portion with consequently greatly-increased wear-resistance to the friction-face portion of the brake friction-strip.

Brake-lining made in accordance with this invention gives more uniform impregnation due to the loose construction of the web, and therefore a more uniform degree of friction throughout the wear-life of the lining, gives longer life, absorbs less water due to the thorough impregnation of the bonding friction-material, and thus also contributes to more uniform friction under varying driving conditions, and gives greater mechanical strength due to the interlocking action between the interstices or openings between the strands in the side-portions of pressed-together adjacent web-lengths, and projections formed by corresponding strand-portions of the side-portions of pressed-together adjacent web-lengths.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A brake friction-strip having an arcuate braking-face portion, and comprising: a plurality of heat-hardenable bonding friction-material-impregnated web-lengths extending longitudinally of said strip and in side-by-side relation with one another as a compressed heat-hardened unitary mass and forming the arcuate braking-face portion of the strip; each said web-length having strands interlaced together to form the web-length of branched form in cross section with at least three branches, and with certain of said branches extending widthwise of the web-length in opposite directions from a location intermediate the width of the web-length, and with at least two of said branches extending in the same direction widthwise of the web-length in side-by-side relation to form said braking-face portion.

2. A brake friction-strip having an arcuate braking-face portion, and comprising: a plurality of heat-hardenable bonding friction-material-impregnated web-lengths extending longitudinally of said strip and in side-by-side relation with one another as a compressed heat-hardened unitary mass and forming the arcuate braking-face portion of the strip; each said web-length having strands interlaced together to form the web-length of branched form in cross section with four branches, and with certain of said branches extending widthwise of the web-length in opposite directions from a location intermediate the width of the web-length, and with two of said branches extending in the same direction widthwise of the web-length in side-by-side relation to form said braking-face portion.

3. A brake friction-strip having an arcuate braking-face portion, and comprising: a plurality of heat-hardenable bonding friction-material-impregnated web-lengths extending longitudinally of said strip and in side-by-side relation with one another as a compressed heat-hardened unitary mass and forming the arcuate braking-face portion of the strip; each said web-length having strands woven together to form the web-length of branched form in cross section with at least three branches, and with certain of said branches extending widthwise of the web-length in opposite directions from a location intermediate the width of the web-length, and with at least two of said branches extending in the same direction widthwise of the web-length in side-by-side relation to form said braking-face portion.

4. A brake friction-strip having an arcuate braking-face portion, and comprising: a plurality of heat-hardenable bonding friction-material-impregnated web-lengths extending longitudinally of said strip and in side-by-side relation with one another as a compressed heat-hardened unitary mass and forming the arcuate braking-face portion of the strip; each said web-length having strands woven together to form the web-length of branched form in cross section with four branches, and with certain of said branches extending widthwise of the web-length in opposite directions from a location intermediate the width of the web-length, and two of said branches extending in the same direction widthwise of the web-length in side-by-side relation to form said braking-face portion.

5. A brake friction-strip having an arcuate braking-face portion, and comprising: a plurality of heat-hardenable bonding friction-material-impregnated web-lengths extending longitudinally of said strip and in side-by-side relation with one another as a compressed heat-hardened unitary mass and forming the arcuate braking-face portion of the strip; each said web-length having strands, a major portion of which have metallic wires extending therealong, interlaced together to form the web-length of branched form in cross section with at least three branches, and with certain of said branches extending widthwise of the web-length in opposite directions from a location intermediate the width of the web-length, and with at least two of said branches extending in the same direction widthwise of the web-length in side-by-side relation to form said braking-face portion.

6. A brake friction-strip having an arcuate braking-face portion, and comprising: a plurality of heat-hardenable bonding friction-material-impregnated web-lengths extending longitudinally of said strip and in side-by-side relation with one another as a compressed heat-hardened unitary mass and forming the arcuate braking-face portion of the strip; each said web-length having strands, a major portion of which have metallic wires extending therealong, interlaced together to form the web-length of branched form in cross section with four branches, and with certain of said branches extending widthwise of the web-length in opposite directions from a location intermediate the width of the web-length, and with two of said branches extending in the same direction widthwise of the web-length in side-by-side relation to form said braking-face portion.

GUSTAV WALTERS.

REFERENCES CITED

The following references are of record in the file of this patent:

UNITED STATES PATENTS

| Number | Name | Date |
|---|---|---|
| 924,788 | Jennings | June 15, 1909 |
| 1,000,765 | Wicke | Aug. 15, 1911 |
| 1,819,344 | Slade | Aug. 18, 1931 |
| 2,074,128 | Nanfeldt | Mar. 16, 1937 |
| 2,196,569 | Stroehla et al. | Apr. 9, 1940 |
| 2,240,358 | Walters | Apr. 29, 1941 |